United States Patent
VanBlon et al.

(10) Patent No.: US 10,671,504 B2
(45) Date of Patent: Jun. 2, 2020

(54) SYSTEM PERFORMANCE MONITORING AND OPTIMIZATION

(71) Applicant: Lenovo (Singapore) Pte. Ltd., Singapore (SG)

(72) Inventors: Russell Speight VanBlon, Raleigh, NC (US); Ratan Ray, Cary, NC (US); Jonathan Gaither Knox, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 14/811,213

(22) Filed: Jul. 28, 2015

(65) Prior Publication Data

US 2017/0031797 A1    Feb. 2, 2017

(51) Int. Cl.
*G06F 11/34* (2006.01)
*G06F 11/30* (2006.01)
*G06F 11/07* (2006.01)

(52) U.S. Cl.
CPC ...... *G06F 11/3409* (2013.01); *G06F 11/3051* (2013.01); *G06F 11/079* (2013.01); *G06F 11/0793* (2013.01); *G06F 11/3466* (2013.01)

(58) Field of Classification Search
None
See application file for complete search history.

(56) References Cited

U.S. PATENT DOCUMENTS

| | | | |
|---|---|---|---|
| 8,805,764 B1* | 8/2014 | Rhines | G06N 5/02 706/46 |
| 2006/0217152 A1* | 9/2006 | Fok | H01M 10/48 455/557 |
| 2011/0301890 A1* | 12/2011 | Shirriff | G01R 31/371 702/63 |
| 2015/0082097 A1* | 3/2015 | Brewer | G06F 11/3409 714/47.1 |
| 2015/0286820 A1* | 10/2015 | Sridhara | G06F 21/566 726/23 |
| 2016/0061904 A1* | 3/2016 | Flugge | H04W 52/0261 702/63 |
| 2017/0031424 A1* | 2/2017 | VanBlon | G06F 1/3234 |

* cited by examiner

*Primary Examiner* — Kim Huynh
*Assistant Examiner* — Joshua Neveln
(74) *Attorney, Agent, or Firm* — Ference & Associates LLC

(57) ABSTRACT

One embodiment provides a method, including: obtaining, using a processor, a system performance metric; determining, using a processor, a change in the system performance metric over time; obtaining, using a processor, system change data; associating, using a processor, the change in the system performance metric and the system change data; and indicating, using an output device, a system change associated with the change in the system performance metric. Other aspects are described and claimed.

16 Claims, 3 Drawing Sheets

SYSTEM PERFORMANCE MONITORING AND OPTIMIZATION

BACKGROUND

Devices such as desktops, laptops, tablet computing devices, mobile phones or smart phones, e-readers, and the like provide users with convenient functionality. Users are particularly interested in devices that are high performance, e.g., quick, error free, and easy to user.

Many users find that the devices they use, when new, are high performance. That is, the devices quickly respond to user inputs, operate largely error free, and overall meet users' expectations. However, for many devices, as a device is used over time, the user often finds that the device does not perform as it did initially. For example, a device may take longer to start up, open and/or make ready an application, load or perform tasks, encounter errors more frequently, etc.

BRIEF SUMMARY

In summary, one aspect provides a method, comprising: obtaining, using a processor, a system performance metric; determining, using a processor, a change in the system performance metric over time; obtaining, using a processor, system change data; associating, using a processor, the change in the system performance metric and the system change data; and indicating, using an output device, a system change associated with the change in the system performance metric.

Another aspect provides a device, comprising: a processor; a memory device that stores instructions executable by the processor to: obtain a system performance metric; determine a change in the system performance metric over time; obtain system change data; associate the change in the system performance metric and the system change data; and indicate a system change associated with the change in the system performance metric.

A further aspect provides a product, comprising: a storage device having code stored therewith, the code being executable by a processor and comprising: code that obtains a system performance metric; code that determines a change in the system performance metric over time; code that obtains system change data; code that associates the change in the system performance metric and the system change data; and code that indicates a system change associated with the change in the system performance metric.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
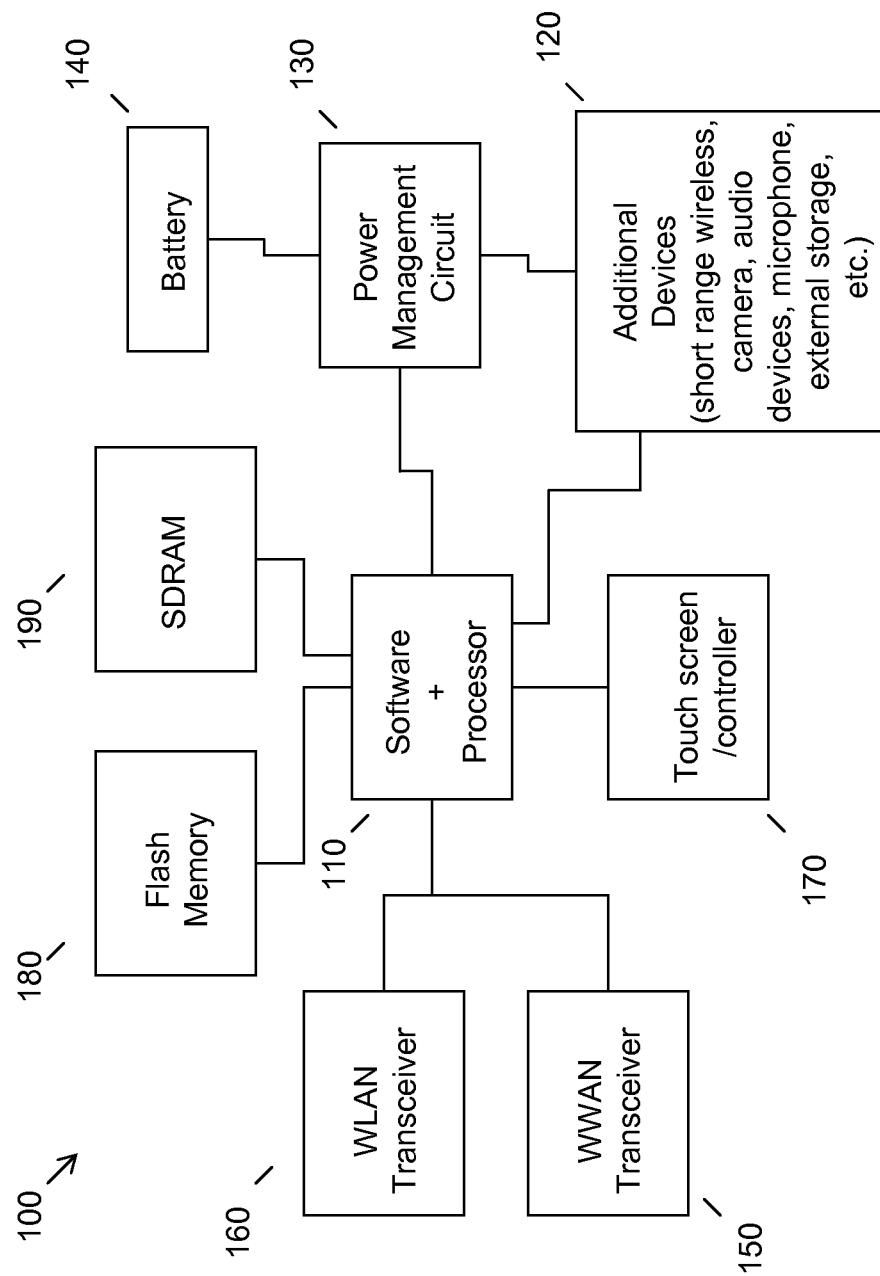
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Over time, devices experience reduced performance, e.g., unresponsiveness or lag. There can be many causes of reduced performance. For example, reduced performance may be due to a growing number of file storage issues (e.g., fragmented files on a rotating disk), many applications running (and thus consuming system resources), and hardware issues (hardware performance reduction, added hardware that conflicts with stock hardware, etc.). Currently, the user must manage the system manually, e.g., clean, defragment, force-stop applications, etc., or via a third-party tool. However, users often do not have the expertise to do this management properly. In addition, the third-party tools are not targeted to a specific machine the user is operating and even if so, often such tools directed to particularized set of issues (e.g., force-stopping applications) as opposed to considering other potential causes of reduce system performance (e.g., hardware conflicts).

Accordingly, an embodiment gathers or monitors data regarding system performance. This system performance data may be collected over time and analyzed, when certain operations occur, such that reductions in performance may be correlated to changes made to the system. A system may be a device itself or a sub-system of a device. Thus, as the system is changed (either via user input, such as download of new software, or naturally over time, e.g., via file fragmentation or reduction in hardware performance over a component's lifecycle), changes in system performance metrics may be correlated with the system change data. This provides a capability to link or associate the system change with the performance reduction, and additionally allows targeted solutions or recommendations to be generated by the system.

System performance measurements may include generating data such as error rate, disk I/O read and write speeds, time to start the operating system (OS), or a particular device or component, time to open an application, hardware response times, etc. Other operations, such as installing applications or modifying application settings, copying or moving files, installing OS or application updates, modifying OS settings, adding a network drive, etc., may be monitored and logged along with a timestamp so this data can be correlated against the performance metrics over time.

In an embodiment, when each operation occurs, the system may compare current performance with previous operation performance statistics. When an operation's performance is reduced (e.g., more time required to perform the same task), the system may indicate this fact, e.g., bring this to the user's attention so they can take action. Additionally, the system may have a solution that is know to address a particular issue. This may be provided to the user, e.g., such that the user is apprised of both the performance reduction and is apprised of a known solution. In an embodiment, a known solution may be automatically implemented. In an embodiment, the proposed solution may need to be confirmed by the user prior to implementation.

Additionally, an embodiment may monitor changes attempted by the user and offer predicted performance impact(s). For example, via tracking a system's performance, and optionally those of other, like systems, an embodiment may indicate to a user the predicted performance impact of the proposed or attempted change.

By way of example, an embodiment may track the performance of an application, e.g., time to report as ready. An embodiment may further record that an application was thereafter changed, e.g., a setting change, and that the application now takes a longer time to report as ready. Thus, an embodiment may indicate this to the user, and moreover may suggest that the application setting be changed back to its original setting or to another setting to address the performance issue.

As another example, if disk I/O read and write speeds become slower in general for all applications, rather than for a specific application, an embodiment may indicate this to the user and recommend that the user defragment the disk. Likewise, if OS startup time increases over time, an embodiment may recommend that the user disable specific applications or services that were added since the system was starting up more quickly. Additionally, if a piece of hardware returns errors and/or takes longer to respond than normal, an embodiment may recommend that the user run a hardware scan on the system to get diagnostic information regarding the hardware and a potential solution. For example, an embodiment may recommend to the user the installation of an application, OS, or driver update based on the diagnostic information. If system performance (e.g., startup time of one or more applications) is slower in general, an embodiment may recommend that the user reset a setting they recently changed that could impact performance.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included. System 100 often includes a touch screen 170 for data input and display/rendering. System 100 also typically includes various memory devices, for example flash memory 180 and SDRAM 190.

Figure 2:
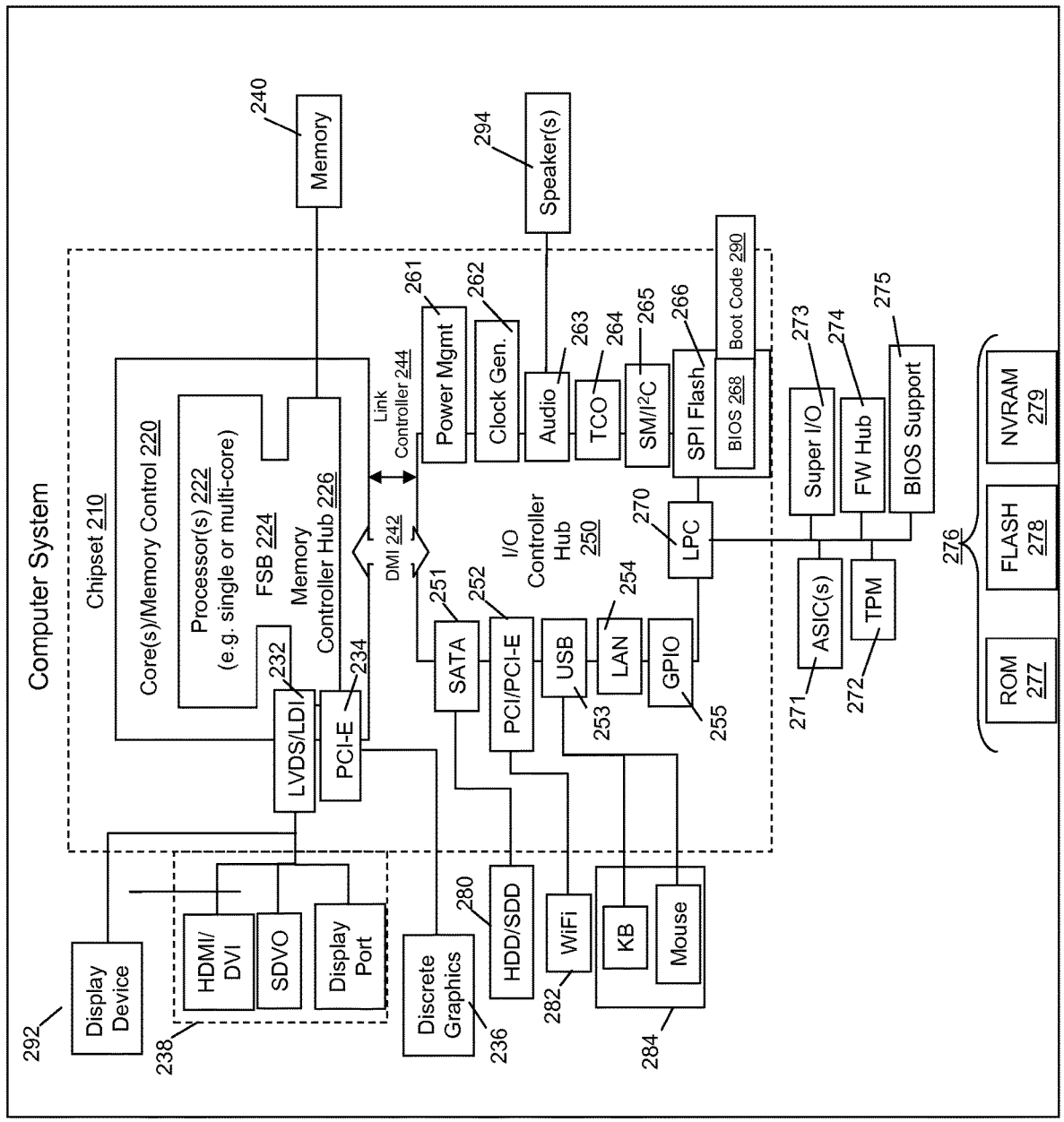
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, desktops, tablets, smart phones, personal computer devices generally, and/or electronic devices that may suffer a reduction in performance over time. Accordingly, an embodiment implements a device monitor that tracks system performance metrics, as described herein, as well as changes which the system has undergone. By virtue of such monitoring program, an embodiment has access to data, e.g., system performance data and system change data, with which reductions in performance may be associated with specific system changes. As such, an embodiment is capable of notifying the likely cause of the performance reduction, and may additionally suggest or automatically implement changes to remedy the same.

Figure 3:
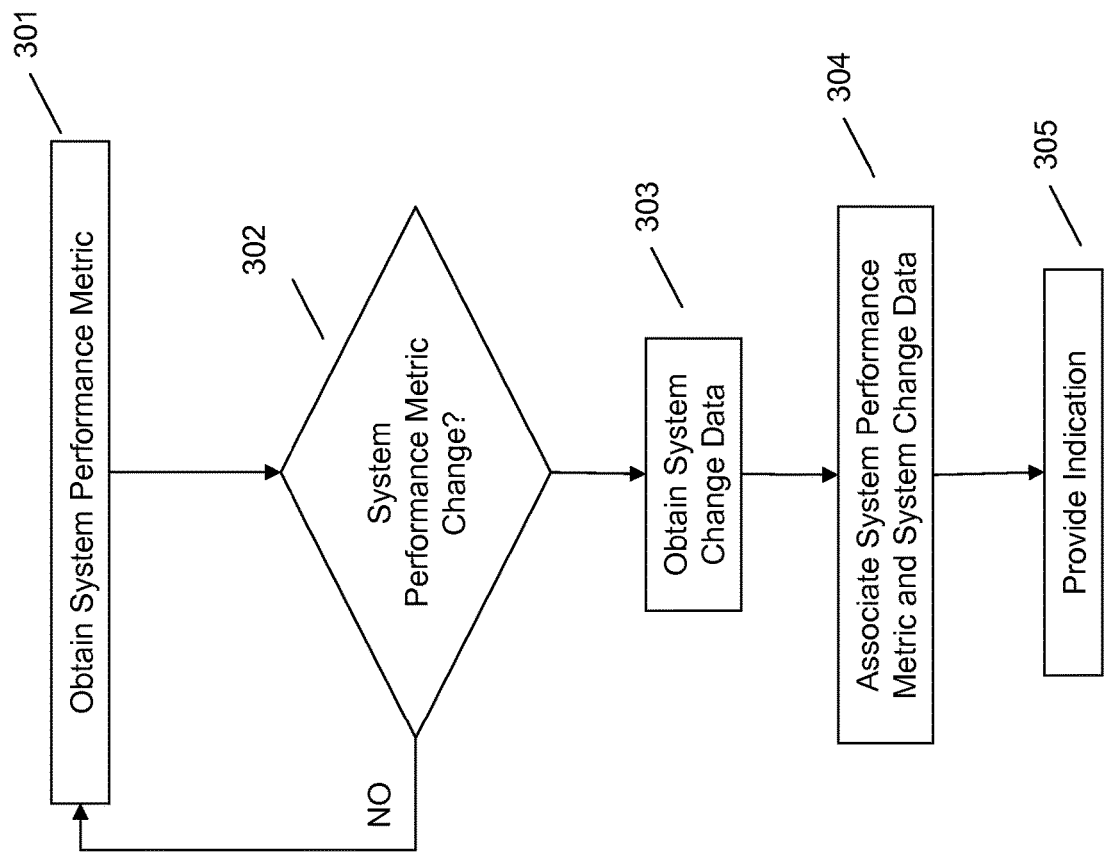
FIG. 3 illustrates an example method of monitoring and optimizing system performance.

Turning to FIG. 3, an example method of system performance monitoring and optimization. As illustrated in FIG. 3, an embodiment obtains, from a monitoring program (e.g., implemented as a stand alone application, integrated with an operating system or device software program, or as a remote or distributed application) a system performance metric at 301. By way of non-limiting example, a monitoring program may monitor the time an application takes to load and report as ready after a user opens it. A monitoring program may repeat this process over time such that an embodiment may determine a change in the system performance metric over time, as illustrated at 302. By way of example, an application's reporting time may increase over time. If no such performance metric change is determined, an embodiment may continue to monitor for the same.

An embodiment may also obtain, e.g., from the monitoring program, system change data at 303. For example, a monitoring program may record any changes that were made (by the user or otherwise, e.g., via automatic update) to the application for which reporting times have been recorded. An example of a system change data is data indicating that an application setting has been switched, along with a time-stamp. This system change data may be time-stamped or otherwise having timing information associated therewith.

Having system performance metrics, system change data, and an indication that system performance has changed over time (e.g., reduced in that the application is taking longer to report as ready), an embodiment may associate the change in the system performance metric and the system change data, as illustrated at 304. By way of example, an embodiment may correlate or associate the system change of an application setting change with a reduction in performance, in this example an application taking longer to report as ready after the application has been opened.

Having made such an association, an embodiment may thereafter indicate, e.g., to the user using an output device, a system change associated with the change in the system performance metric, as illustrated at 305. By way of example, a message may be displayed or otherwise communicated to the user indicating that the system performance has reduced for a particular application and that a particular setting is associated with that change, e.g., associated in time. This apprises the user of the suspected cause of the reduction in performance and provides the user with guidance as to how to resolve the issue.

An embodiment may offer a recommendation to improve the change in system performance. For example, an embodiment may indicate a different setting that resolves the performance issue in question. By way of example, an application that is taking a longer time to report as ready may have a cache size that is too large, and an embodiment may thus recommend to the user that the cache should be cleared for the application. An embodiment may provide in the indication a link or executable element that leads the user to the appropriate settings menu to implement the recommended change. Furthermore, an embodiment may automatically implement a system change to improve the change in system performance, e.g., automatically flush the cache or do so after user confirmation of the same.

As has been described herein, the monitoring program may be resident on the user's device; however, this is not a requirement. For example, the monitoring program may be distributed across more than one device. Furthermore, the monitoring program's data may be stored in a variety of locations, e.g., the system change data may be derived from a remote device. This allows, for example, pooling of system performance data and/or system change data, e.g., the system change data may relate to a plurality of like platforms. A platform may be alike if the software is similar, the hardware is similar, or the system is similar. As may be appreciated, if relevant data is available from other systems, an embodiment may indicate to or warn the user of a potential impact of making a system change, i.e., as it relates to system performance. Thus, the indication of the association between a system change and system performance may occur prior to the determining of a system performance change for a particular device.

The various embodiments described herein thus represent a technical improvement to the management of system performance. By way of specific example, an embodiment implements a new monitoring capability that in turn generates new and useful data that may be leveraged not only to highlight potential system changes that impact system performance, but moreover to make specific and tailored recommendations regarding the resolution or avoidance of the same.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, over time, using a processor, a change in a system performance metric indicating a measurement of system performance by a system, wherein the identifying a change comprises monitoring an application of an information handling device while the system is running over the time and determining that the system performing an operation has a lower system performance at the end of the time, and after a plurality of changes to the system has occurred, as compared to a reference system performance of the system performing the operation at a beginning of the time, wherein the system performance metric corresponds to performance of an operation within the application and is based upon a length of time to perform the operation as determined by at least one time-stamp correlated to the operation;
   obtaining, using a processor, system change data identifying a plurality of changes to the system that have occurred since the beginning of the time corresponding to the reference system performance of the system, wherein the system change data is based in part on the at least one time-stamp;
   associating, using a processor, the change in the system performance metric and the system change data, wherein the associating comprises identifying one of the plurality of changes to the system resulting in the change in the system performance metric, wherein the associating correlates the system performance metric and the system change data on a like platform;
   indicating, using an output device, a system change associated with the change in the system performance metric, a recommendation for improving the system performance, and an executable element for a user to implement the improvement of the system performance, wherein the recommendation is based upon identifying a modification to be made to the system to improve the system change and that is related to the identified one of the plurality of changes that resulted in the change, and a predicted performance impact resulting from the system change, wherein the predicted performance impact is based on at least one other system.

2. The method of claim 1, wherein the implemented change to the system is associated with the system change data.

3. The method of claim 1, wherein the obtaining is performed by a monitoring program distributed across more than one device.

4. The method of claim 1, wherein the system change data is derived from a remote device.

5. The method of claim 1, wherein the system change data relates to a plurality of like platforms.

6. The method of claim 5, wherein the indicating occurs prior to the determining for a particular device.

7. The method of claim 1, wherein the system performance metric is selected from the group consisting of error rate, disk I/O read time, disk I/O write time, time to load an operating system (OS), time to start a device component, time to open an application, and hardware response time.

8. The method of claim 1, further comprising storing locally the system performance metric and the system change data.

9. A device, comprising:
a processor;
a memory device that stores instructions executable by the processor to:
identify, over time, a change in a system performance metric indicating a measurement of system performance by a system, wherein the identifying a change comprises monitoring an application of an information handling device while the system is running over the time and determining that the system performing an operation has a lower system performance at the end of the time, and after a plurality of changes to the system has occurred, as compared to a reference system performance of the system performing the operation at a beginning of the time, wherein the system performance metric corresponds to performance of an operation within the application and is based upon a length of time to perform the operation as determined by at least one time-stamp correlated to the operation;
obtain system change data identifying a plurality of changes to the system that have occurred since the beginning of the time corresponding to the reference system performance of the system, wherein the system change data is based in part on the at least one time-stamp;
associate the change in the system performance metric and the system change data, wherein the instructions executable by the processor to associate comprise instructions executable by the processor to identify one of the plurality of changes to the system resulting in the change in the system performance metric, wherein the associating correlates the system performance metric and the system change data on a like platform;
indicate a system change associated with the change in the system performance metric, a recommendation for improving the system performance, and an executable element for a user to implement the improvement of the system performance, wherein the recommendation is based upon identifying a modification to be made to the system to improve the system change and that is related to the identified one of the plurality of changes that resulted in the change, and a predicted performance impact resulting from the system change, wherein the predicted performance impact is based on at least one other system; and implement the recommendation to improve the change in system performance.

10. The device of claim 9, wherein the implemented change to the system is associated with the system change data.

11. The device of claim 9, wherein the system performance metric is obtained using a monitoring program distributed across more than one device.

12. The device of claim 9, wherein the system change data is derived from a remote device.

13. The device of claim 9, wherein the system change data relates to a plurality of like platforms.

14. The device of claim 13, wherein a system change is indicated prior to determining a change in system performance for the device.

15. The device of claim 9, wherein the system performance metric is selected from the group consisting of error rate, disk I/O read time, disk I/O write time, time to load an operating system (OS), time to start a device component, time to open an application, and hardware response time.

16. A product, comprising:
a storage device having code stored therewith, the code being executable by a processor and comprising:
code that identifies, over time, a change in a system performance metric indicating a measurement of system performance by a system, wherein the identifying a change comprises monitoring an application of an information handling device while the system is running over the time and determining that the system performing an operation has a lower system performance at the end of the time, and after a plurality of changes to the system has occurred, as compared to a reference system performance of the system performing the operation at a beginning of the time, wherein the system performance metric corresponds to performance of an operation within the application and is based upon a length of time to perform the operation as determined by at least one time-stamp correlated to the operation;
code that obtains system change data identifying a plurality of changes to the system that have occurred since the beginning of the time corresponding to the reference system performance of the system, wherein the system change data is based in part on the at least one time-stamp;
code that associates the change in the system performance metric and the system change data, wherein the code that associates comprises code that identifies one of the plurality of changes to the system resulting in the change in the system performance metric, wherein the associating correlates the system performance metric and the system change data on a like platform;
code that indicates a system change associated with the change in the system performance metric, a recommendation for improving the system performance, and an executable element for a user to implement the improvement of the system performance, wherein the recommendation is based upon identifying a modification to be made to the system to improve the system change and that is related to the identified one of the plurality of changes that resulted in the change, and a predicted performance impact resulting from the system change, wherein the predicted performance impact is based on at least one other system; and code that implements the recommendation to improve the change in system performance.

\* \* \* \* \*